United States Patent [19]

Sakakibara

[11] Patent Number: 4,993,807
[45] Date of Patent: Feb. 19, 1991

[54] VEHICLE LAMP LENS
[75] Inventor: Koichi Sakakibara, Shizuoka, Japan
[73] Assignee: Koito Manufacturing Co., Ltd., Tokyo, Japan
[21] Appl. No.: 396,204
[22] Filed: Aug. 21, 1989
[30] Foreign Application Priority Data Aug. 22, 1988 [JP] Japan .................. 63-109043[U]

[51] Int. Cl.⁵ .................. G02B 27/00; F21V 5/02
[52] U.S. Cl. .................. 350/167; 362/326; 362/339
[58] Field of Search .......... 350/167, 168, 452; 362/80, 80.1, 268, 309, 332, 336, 337, 338, 339, 340, 326

[56] References Cited

U.S. PATENT DOCUMENTS

| | | | |
|---|---|---|---|
| 2,762,912 | 9/1956 | Onksen et al. | 362/337 |
| 3,330,951 | 7/1967 | Neal | 362/339 |
| 3,818,218 | 6/1974 | Heenan et al. | 362/309 |
| 4,577,260 | 3/1986 | Tysoe | 362/268 |
| 4,652,979 | 3/1987 | Arima | 362/80.1 |
| 4,740,875 | 4/1988 | Wyckoff et al. | 362/309 |
| 4,745,530 | 5/1988 | Farrell, Jr. et al. | 362/80 |
| 4,787,722 | 11/1988 | Claytor | 350/452 |
| 4,859,043 | 8/1989 | Carel et al. | 350/452 |

FOREIGN PATENT DOCUMENTS 722570 12/1931 France .................. 362/268

Primary Examiner—Bruce Y. Arnold
Assistant Examiner—R. D. Shafer
Attorney, Agent, or Firm—Sughrue, Mion, Zinn, Macpeak & Seas

[57] ABSTRACT

A lens for a vehicle lamp having a central bright portion and a surrounding portion of lesser brightness and which can be manufactured as a single unit. The lens surface is formed with arcuate step-like blocks circumferentially separated from one another and divided from one another by a plurality of concentric lines and radial lines. The blocks in a central portion of the lens have a refractive configuration, while the blocks disposed outside of the central portion have a linearly transmitting configuration. The two types of blocks are arranged continuously and unitarily in a concentric manner in a radial direction of the central portion.

5 Claims, 3 Drawing Sheets

VEHICLE LAMP LENS

BACKGROUND OF THE INVENTION

The present invention relates to a vehicle lamp lens having refractive-type step blocks and linearly transmitting-type step blocks intermixed with one another.

As shown in FIGS. 6 and 7, conventionally a Fresnel lens has been employed as an inner lens 50 for use in various vehicle signal and illumination lamps, the Fresnel lens having linearly transmitting-type step blocks 51 at its peripheral portion and refractive-type step blocks 52 at its central portion. The step blocks 51 and 52 are arranged in a concentric, intermixed manner. In a vehicle lamp lens of a double-lens construction in which an outer lens 53 is disposed forward of the front face of the inner lens 50 in opposed relation & thereto, fisheye steps 54 are formed on either the reverse face of the outer lens 53, as illustrated in FIG. 7, or on the front face of the inner lens 50 so as to enhance the diffusion or scattering of illuminating light rays emitted from a light source 55 such as a bulb.

Fisheye steps 54, however, can generally be observed as a lattice-like configuration at the front face of the lens. On the other hand, because the linearly transmitting-type step blocks 51 and refractive-type step blocks 52 of the inner lens 50 corresponding to the fisheye steps 54 are arranged in a concentric manner, a brightness difference develops at the boundary B between the linearly transmitting-type step blocks 52 and the refractive-type step blocks 51 on the surface of the inner lens 50 due to their differing light-transmitting properties or efficiencies. Therefore, when the lamp is lit, & the boundary B between the linearly transmitting-type step blocks 51 and the refractive-type step blocks 52 forms a dark area or portion C on the surface of the inner lens 50 (FIG. 6). As a result, the dark portion C is projected onto the fisheye steps 54, which detracts from the appearance of the lamp as viewed from the front side of the lens.

Therefore, as shown in FIG. 8, there has conventionally been employed an inner lens 50 of the type in which refractivetype step blocks 52, constituting a given illumination area, are made square or rectangular in conformity with the latticelike configuration of the fishey steps 54 on the outer lens 53. Thus, the dark portion C, formed at the boundary between the linearly transmitting-type step blocks 51 and refractive-type step blocks 52 of the inner lens 50, corresponds to the lattice-like boundary of the fisheye steps 54 formed on the outer lens 53, thereby reducing the undesirable optical effects produced by the dark portion C. However, to manufacture the inner lens 50 having such linearly transmitting-type step blocks 51 and refractive-type step blocks 52, the step blocks 51 and 52 are first individually molded using separate molds, and thereafter the molded blocks are combined into a unitary construction of the so-called insert type (the insert being indicated by an arrow D). As a result, the manufacturing cost of the inner lens 50 is high. Moreover, since it is rather difficult to prepare an insert mold of a s complicated shape, Only a simple shape such as a square or a rectangular shape can be obtained.

SUMMARY OF THE INVENTION

An object of the present invention, therefore, is to provide a vehicle lamp lens wherein, in an inner lens of the above construction, linearly transmitting-type step blocks and refractive-type step blocks of the inner lens are arranged in an intermixed manner corresponding to the configuration of the optical steps, such as fisheye steps, when the lamp is lit, thereby improving the appearance as viewed from the front side of the lens. It is a further object to provide a lamp lens having a complex arrangement of the step blocks so that the appearance can be made complex and can be freely selected. It is a still further object of the invention to provide such a lamp lens which can be manufactured at low cost.

According to the present invention, there is provided a vehicle lamp lens wherein a number of arcuate step-like blocks circumferentially separated from one another are formed on a lens surface along a number of concentric step lines and radial lines dividing the step lines in the radial direction, refractive step blocks are formed within an area of a predetermined shape at the central portion of the lens, linearly transmitting-type step blocks are formed outside of the central portion, and the linearly transmitting-type step blocks and the refractive-type step blocks are formed continuously and unitarily in a concentric manner in the radial direction.

In the vehicle lamp lens according to the present invention, the surface of the inner lens is divided into step-like blocks arranged in a mosaic pattern in both concentric and radial directions, with the refractive-type step blocks being formed in the central portion of the block pattern while the linearly transmitting-type step blocks are formed outside of the central portion. With this arrangement, the need for an insert-type mold in manufacturing the lens is eliminated, and the shape of the lens, taking into consideration brightness variations when the lamp is lit, is not limited to a simple shape such as a circular or rectangular shape, but can be selected by changing the shape of the fisheye or other steps. Further, uniform brightness over the front face of a double-construction lens can be obtained, thereby improving the optical appearance of the lamp.

DESCRIPTION OF THE PREFERRED EMBODIMENTS

Figure 1:
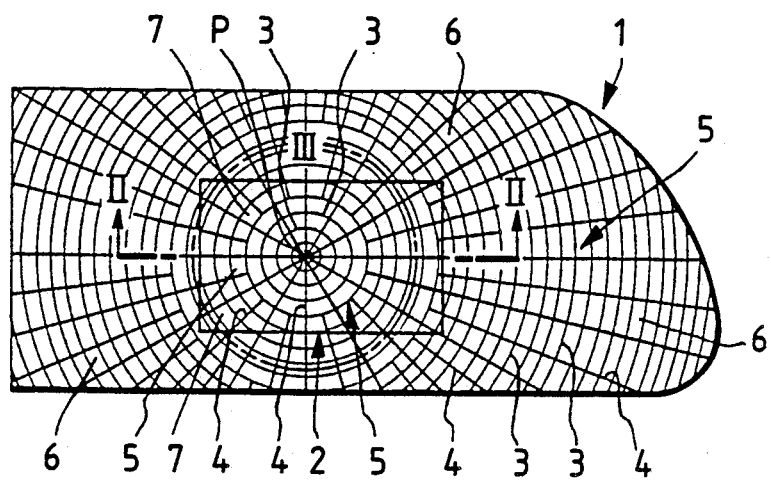
FIG. 1 is a front-elevational view of a preferred embodiment of a vehicle lamp lens of the present invention.
Figure 2:
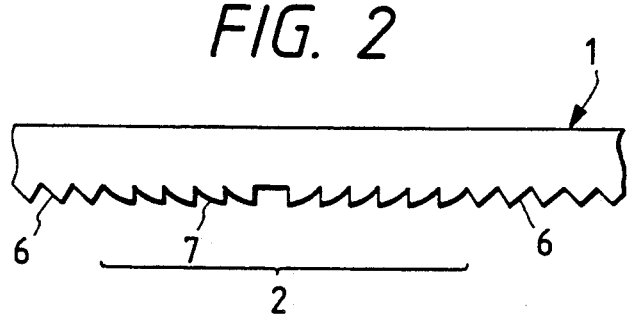
FIG. 2 is an enlarged cross-sectional view taken along a line II—II in FIG. 1.
Figure 3:
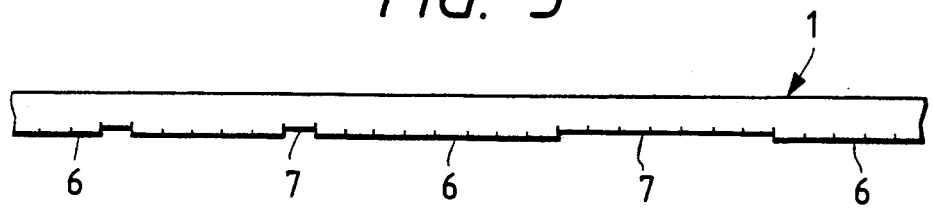
FIG. 3 is an enlarged view taken along a circular line III in FIG. 1.
Figure 8:
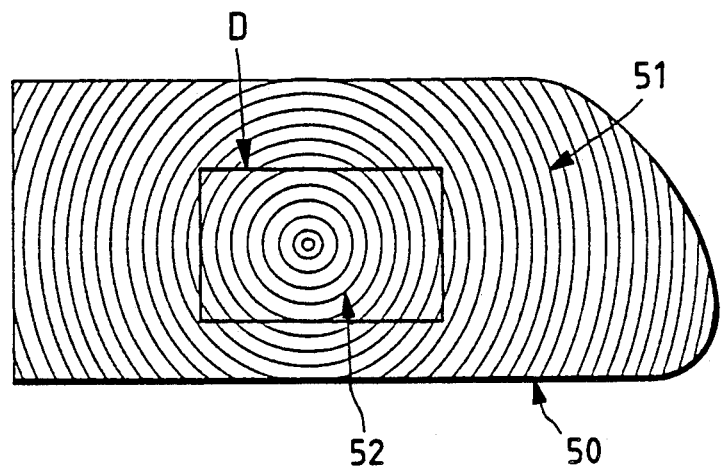
FIG. 8 is a rear view of a conventional inner lens showing an intermixed arrangement of linearly transmitting-type step block and refractive-type step blocks.

A preferred embodiment of a vehicle lamp lens of the present invention will now be described with reference to FIGS. 1 to 3. In this embodiment, the vehicle lamp lens according to the present invention is embodied as an inner lens 1. The inner lens 1 has a rectangular bright area 2 at its central portion. The shape of the central bright area 2 is determined in accordance with the required appearance of the vehicle lamp using the lens of the present invention and also in accordance with the shape of various diffusing steps formed on an outer lens (not shown). The central bright area 2 achieves illuminating effects similar to those achieved by the prior art arrangement shown in FIG. 8.

More specifically, in the illustrated embodiment, the rectangular bright area 2 is formed at the central portion of the inner lens 1. Concentric step lines 3 formed on the inner lens 1 have a common center at a point P substantially at the center of the central bright area 2. Refractive-type steps are formed between each two adjacent step lines 3 at the central portion, while linearly transmitting-type steps are formed between each two adjacent step lines 3 at the outer peripheral portion. The step lines 3 at both the central and outer peripheral portions are circumferentially divided by radial lines 4 to form a number of arcuate step-like blocks 5 to thereby divide the whole area of the inner lens 1 into a concentric mosaic pattern.

The step-like blocks 5 are classified into a first type forming linearly transmitting-type step blocks 6 and a second type forming refractive-type step blocks 7, depending on whether the step-like blocks 5 are disposed outside or inside of the central bright area 2.

Figure 4:
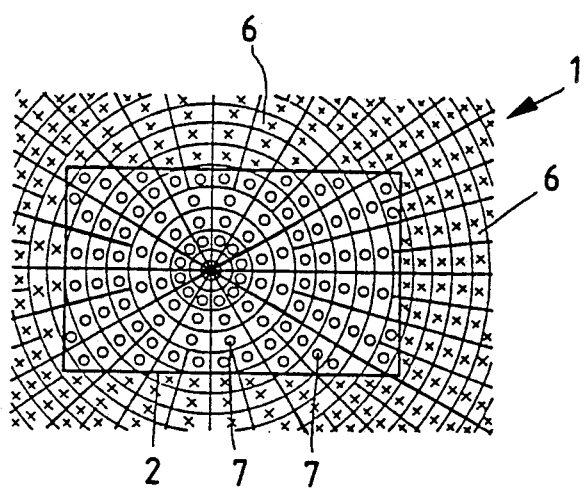
FIG. 4 is a view explanatory of the relation of step-like blocks and a central bright area.

More specifically, as shown in FIG. 4, in the regions outside of the central rectangular bright area 2 and indicated by an "X" mark, the step-like blocks 5 are formed by linearly transmitting-type steps 6, whereas in the portions disposed inside the bright area 2 and indicated by an "O" mark, the step-like blocks 5 form the refractive-type steps 7.

Figure 5:
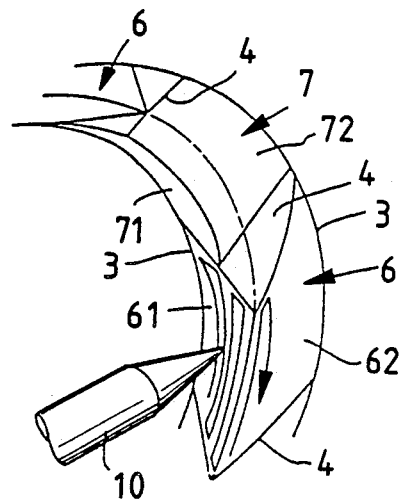
FIG. 5 is a view explaining how the mold for the vehicle lamp lens is machined.
Figure 6:
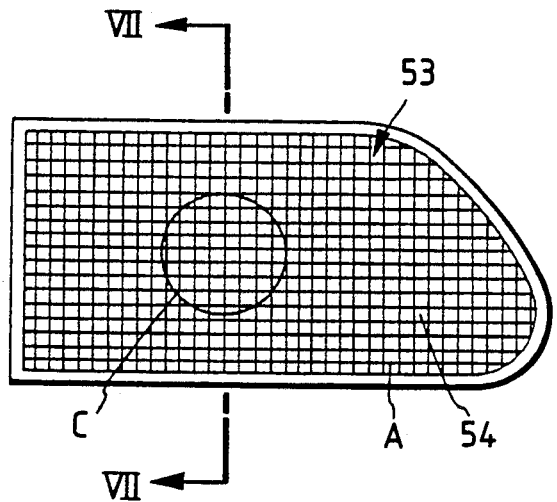
FIG. 6 is a front-elevational view of a conventional vehicle lamp lens of a double lens construction.
Figure 7:
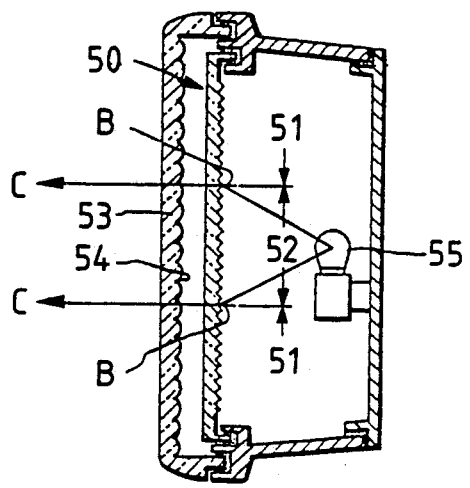
FIG. 7 is an enlarged cross-sectional view taken along a line VII—VII in FIG. 6.
Figure 9:
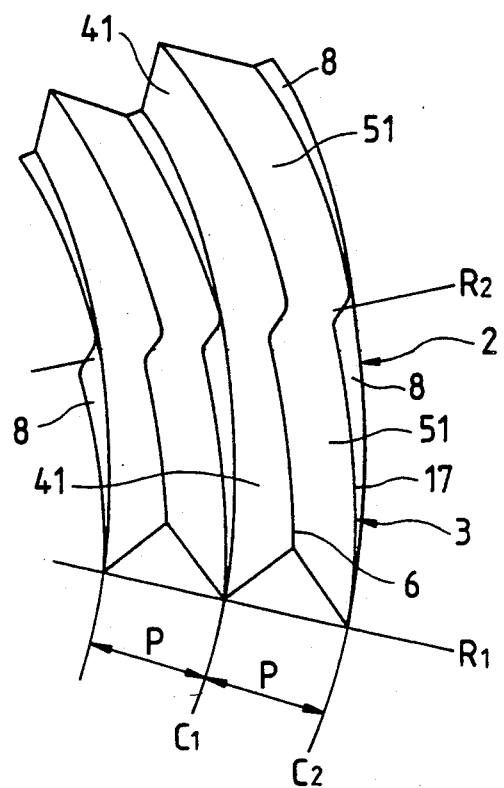
FIG. 9 is a view of a portion of a lens element wherein abrupt boundaries between adjacent blocks are made smoothly continuous to reduce abberational effects.

A mold for forming the linearly transmitting-type step blocks 6 and the refractive-type step blocks 7 while molding the inner lens 1 can be produced using a three-axis milling machine in such a manner that an inner inclined surface 61 (71) and an outer inclined surface 62 (72) are cut by a cutter 10 at respective angles (see FIG. 5, which illustrates successive blocks 6 and 7). The cutter 10 is moved in a scanning manner to cut each step-like block 5, demarcated by the step lines 3 and the radial lines 4, to form the linearly transmitting-type step blocks 6 and the refractive-type step blocks 7. The cutter 10 sequentially cuts the adjoining step-like blocks 5 to form an annular pattern with step blocks juxtaposed in the circumferential direction. For a complete description of mold formation methods useful in defining the step-like blocks, the reader is referred to U.S. patent application Ser. No. 07/334,620, which discloses such processes and such blocks in detail, and which is herein incorporated by reference. In general, the blocks may be cut in one of two ways, either with the inclination angles for a given lens element (i.e., a given block) fixed, or with inclination angles which are smoothly variable within each block itself. The former technique results in the creation of some discontinuities at the block boundaries in the circumferential direction. Such discontinuities are undesirable since they can lead to the creation of abberational effects when light is passed through the lens. To counter this problem, the method of machining the mold may be altered somewhat so as to smooth the boundaries between adjacent blocks, resulting in lens elements as illustrated in FIG. 9. In this figure, as can be easily seen, the lens element inclined surfaces 41 and 51 of one block smoothly blend into the like surfaces of the adjacent block in the circumferential direction. In FIG. 9 there can also be seen flats 8 which are created as a result of the use of constant inclination angles for the inclined surfaces of each block. That is, a small flat is created between a given pitch baseline Cn (pointed to by reference numeral 2) and the outer root line 3 at the root of the inclined surface 51. It is desirable < to keep these flats as small as possible, and toward this end the number of radial division lines 4, represented by R1 and R2 in FIG. 9, is increased to decrease the size of each block and thus the size of any flat. By increasing the number of radial divisions 4 to the practical limit which still enables engraving of the lens mold, the flats 8 can for practical purposes be eliminated. This, in combination with the smoothly continuous or meandering manner of the adjacent steps, creates an optically improved lens element. In the manner of FIG. 9, smoothly continuous boundaries at transition points between refractive type-blocks and linearly transmitting type-blocks are also obtained. The above description relates to the case of a lens having a central bright area 2 of a rectangular shape. However, in the vehicle lamp lens of the present invention, the refractive type step blocks in the central bright area 2, are arranged in a mosaic pattern, and therefore the mosaic pattern of the bright area 2 can be suitably modified so as to obtain various different shapes to obtain a divided appearance when the lamp is lit.

In the vehicle lamp lens of the present invention having the above construction, the linear transmitting-type step blocks and refractive-type step blocks are arranged in a concentric mosaic pattern, with the refractive-type blocks being formed in a central portion of the inner lens of a predetermined shape. With this arrangement, the shape of the central portion is not limited to a simple shape such as a circular or rectangular shape, and therefore the bright area of the lamp can be made to have any of various shapes without using an insert-type mold. The adverse optical effects of a dark portion developing due to a brightness difference at the boundary between linearly transmitting-type step blocks and refractive-type step blocks are greatly reduced, and a better appearance is obtained when the lamp is viewed from the front side of the lens. Further, the illuminating pattern can be freely designed to enhance visual recognizability, and the inner lens can be manufactured at a lower cost.

What is claimed is:

1. A vehicle lamp lens comprising: a lens body; and a plurality of arcuate step-like blocks circumferentially and radially separated from one another and arranged in a mosaic pattern, said blocks being formed on a lens surface of said lens body, and separated from one another along a plurality of concentric and radial lines, ones of said blocks in a central portion of said lens having a refractive configuration, and ones of said blocks disposed outside of said central portion having a nonrefractive linear transmitting configuration, said ones of said blocks having said linear transmitting configuration and said ones of said blocks having said refractive configuration being arranged continuously and unitarily in a concentric manner in a radial direction of said central portion.

2. The vehicle lamp lens of claim 1, wherein said central portion is circular in shape.

3. The vehicle lamp lens of claim 1, wherein said central portion is rectangular in shape.

4. The vehicle lamp lens of claim 1, wherein boundaries between circumferentially adjacent blocks are made smoothly continuous to eliminate abrupt discontinuities giving rise to abberational effects.

5. The vehicle lamp lens of claim 1, wherein a pitch of said ones of said blocks having said linear transmitting configuration and said blocks having said refractive configuration is substantially constant in said radial direction.

* * * * *